US010243365B2

(12) United States Patent
Tamayo Ruiz et al.

(10) Patent No.: US 10,243,365 B2
(45) Date of Patent: Mar. 26, 2019

(54) POWER SYSTEM EQUIPMENT INTRODUCTION ASSISTANCE DEVICE AND METHOD

(71) Applicant: Hitachi, Ltd., Chiyoda-ku, Tokyo (JP)

(72) Inventors: Efrain Eduardo Tamayo Ruiz, Tokyo (JP); Shuji Katoh, Tokyo (JP); Shinya Oohara, Tokyo (JP); Shigenori Inoue, Tokyo (JP); Tohru Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/576,949

(22) PCT Filed: May 27, 2015

(86) PCT No.: PCT/JP2015/065166
§ 371 (c)(1),
(2) Date: Nov. 27, 2017

(87) PCT Pub. No.: WO2016/189676
PCT Pub. Date: Dec. 1, 2016

(65) Prior Publication Data
US 2018/0159329 A1  Jun. 7, 2018

(51) Int. Cl.
*H02J 3/28* (2006.01)
*H02J 3/00* (2006.01)
(Continued)

(52) U.S. Cl.
CPC ............ *H02J 3/28* (2013.01); *G05B 13/021* (2013.01); *H02J 3/00* (2013.01); *H02J 3/005* (2013.01);
(Continued)

(58) Field of Classification Search
CPC ...... H02J 3/00; H02J 3/38; H02J 3/005; H02J 3/383; G06Q 10/06; G06Q 10/04; Y02E 60/76; H02M 3/04
(Continued)

(56) References Cited

U.S. PATENT DOCUMENTS 7,239,977 B2 *  7/2007  Fantana ............... G06Q 10/06
                                                    700/26
8,655,521 B2 *  2/2014  Brooks ................. B61L 3/006
                                                    105/61
(Continued)

FOREIGN PATENT DOCUMENTS

JP    2006-296030    * 10/2006
JP    2006-296030 A  10/2006
(Continued)

OTHER PUBLICATIONS

International Search Report (PCT/ISA/210) issued in PCT Application No. PCT/JP2015/065166 dated Aug. 25, 2015 with English translation (two (2) pages).
(Continued)

*Primary Examiner* — Rajnikant B Patel
(74) *Attorney, Agent, or Firm* — Crowell & Moring LLP

(57) ABSTRACT

Conventionally, optimum introduction assistance for devices including a FACTS device and a storage adapted to changes in impedance and a transmission capacity involved in an increase of renewable energy power supplies has not been achieved. Therefore, in order to solve the problem, the present invention provides a power system equipment introduction assistance device that calculates an introduction point of power system equipment coupled to a power system, the introduction assistance device including a calculating unit configured to calculate, on the basis of predetermined system information and information concerning the power system equipment scheduled to be introduced, a characteristic of the power system affecting the power system during the introduction of the power system equipment and calculate the introduction point of the power system equipment from a predetermined evaluation index related to the characteristic of the power system.

8 Claims, 8 Drawing Sheets

(51) Int. Cl.
  G05B 13/02  (2006.01)
  H02J 3/10   (2006.01)
  H02J 3/24   (2006.01)
  H02J 3/38   (2006.01)
  H02J 13/00  (2006.01)

(52) U.S. Cl.
  CPC .......... *H02J 3/10* (2013.01); *H02J 3/24* (2013.01); *H02J 3/382* (2013.01); *H02J 13/001* (2013.01); *H02J 13/0062* (2013.01); *H02J 2003/007* (2013.01)

(58) Field of Classification Search
  USPC .......... 702/62, 182–185, 189; 323/205, 209, 323/343, 351, 255; 700/293, 297, 287
  See application file for complete search history.

(56) References Cited

U.S. PATENT DOCUMENTS 9,335,748 B2 * 5/2016 Francino ............ G05B 15/02
2012/0022713 A1 * 1/2012 Deaver, Sr. ............ G05B 17/02
                                              700/298

FOREIGN PATENT DOCUMENTS

JP  2013-074696    *  4/2013
JP  2013-074696 A     4/2013

OTHER PUBLICATIONS

Japanese-language Written Opinion (PCT/ISA/237) issued in PCT Application No. PCT/JP2015/065166 dated Aug. 25, 2015 (three (3) pages).

Zhang et al.,"Optimal Allocation of Shunt Dynamic Var Source SVC and STATCOM, A Survey", Proc. 2006 7th IEEE International Conference on Advances in Power System Control, Operation and Management (APSCOM), pp. 1-7.

Bompard et al., "Extended Topological Approach for the Assessment of Structural Vulnerability in Transmission Networks", IET Generation, Transmission & Distribution, 2010, pp. 716-724, Vo. 4, Iss. 6.

* cited by examiner

POWER SYSTEM EQUIPMENT INTRODUCTION ASSISTANCE DEVICE AND METHOD

TECHNICAL FIELD

The present invention relates to a power system equipment installation assistance device and a method for determining an introduction point of power system equipment coupled to a power system.

BACKGROUND ART

In a power system, conventionally, power has been supplied mainly by a power generation method in which fossil fuel is used such as thermal power generation. In recent years, from the viewpoint of climate change and energy security, distributed power supplies and renewable energy power supplies have been increasing. However, outputs of the renewable energy power supplies considerably depend on weather and easily change. Therefore, according to the increase of the renewable energy power supplies, there is concern about deterioration in power system quality and adverse effects on stable supply.

As measures against these problems, it is possible to reduce the deterioration in the power system quality and the adverse effects on the stable supply through introduction of power system equipment (hereinafter described as device) including a FACTS (Flexible AC Transmission System) device and a storage. Extension of transmission lines is expensive and requires several years as an extension period. On the other hand, installation of the FACTS device and the storage is inexpensive compared with the transmission line extension and has less influence on the environment.

A power company, a TSQ (Transmission Systems Operator), and a DSO (Distribution Systems Operator) can determine installation places and introduction capacities of the FACTS device, the storage, and the like on the basis of detailed information concerning a power system such as operation information of devices and the size of power demands (NPTL 1).

NPTL 2 discloses a method of evaluating stability of a power system using indexes called "net-ability" and "entropy degree" on the basis of a complex network theory.

CITATION LIST

Non Patent Literature

NPTL 1: Zhang, F. Li, and L. M. Tolbert, Optimal allocation of shunt dynamic var source SVC and STATCOM, A survey, in Proc. 2006 7th IEEE International Conference on Advances in Power System Control, Operation and Management (APSCOM).

NPTL 2: e. Bompard, R. Napoli, and F. Xue, Extended topological approach for the assessment of structural vulnerability in transmission networks, IET Gener. Transm. Distrib., vol. 4, No. 6, pp. 716-724, 2010.

SUMMARY OF INVENTION

Technical Problem

However, the detailed information concerning the power system is owned by the power company, the TSO, and the DSO and is not disclosed to the public. Therefore, in agencies other than the above, it is difficult to obtain information concerning the power system necessary for evaluating adverse effects involved in the increase of the renewable energy power supplies and installation places and introduction capacities of the FACTS device, the storage, and the like.

By using the complex network theory, instead of a conventional calculation method that requires a lot of information concerning the power system, it is possible to evaluate the stability of the power system with less information. However, NPTL 2 refers to only the existing method of evaluating the stability of the power system and does not refer to a method of evaluating the installation places and the introduction capacities of the FACTS device, the storage, and the like.

Consequently, optimum introduction assistance for devices including the FACTS device and the storage adapted to changes in impedance and a transmission capacity involved in the increase of the renewable energy power supplies has not been achieved.

Solution to Problem

Therefore, in order to solve the problems, the present invention provides a power system equipment introduction assistance device that calculates an introduction point of power system equipment coupled to a power system, the introduction assistance device including a calculating unit configured to calculate, on the basis of predetermined system information and information concerning the power system equipment scheduled to be introduced, a characteristic of the power system affecting the power system during the introduction of the power system equipment and calculate the introduction point of the power system equipment from a predetermined evaluation index related to the characteristic of the power system.

Advantageous Effects of Invention

According to the present invention, concerning introduction points of the devices including the FACTS device and the storage adapted to the changes in the impedance and the transmission capacity involved in the increase of the renewable energy power supplies, an influence degree on the system that occurs during the introduction is evaluated by the predetermined index. Consequently, it is possible to perform optimum introduction assistance of the device.

DESCRIPTION OF EMBODIMENT

Figure 1:
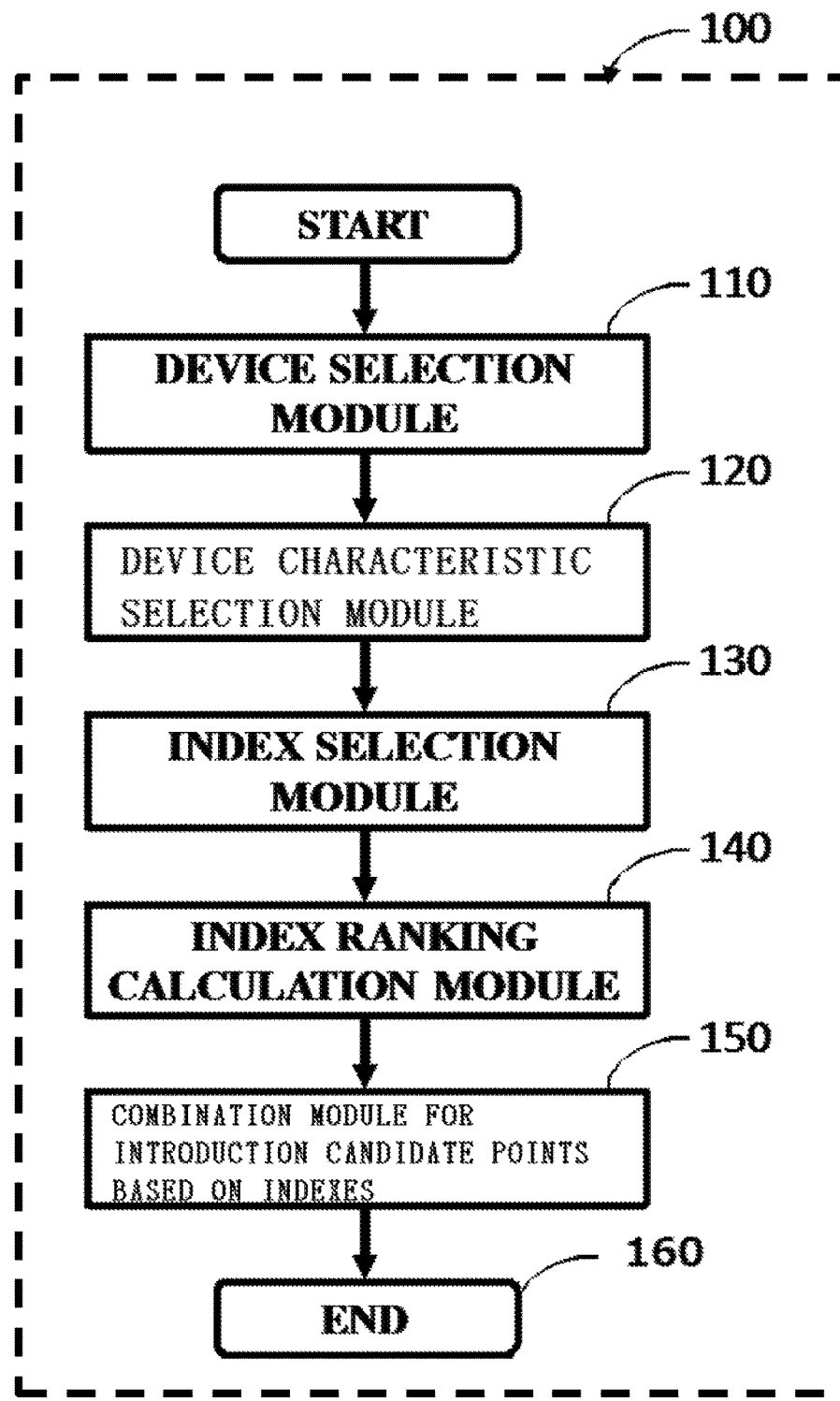
FIG. 1 shows a calculation flowchart example for specifying candidate points for introducing devices that absorb or supply electric power.

An embodiment of the present invention is explained below with reference to the drawings. Note that the embodiment explained below indicates a form of the present invention. The present invention includes other forms without departing from the spirit of the present invention.

In the embodiment, an example of the present invention is explained with reference to FIG. 1 to FIG. 9.

First, a system example and an effect of a calculation flowchart 100 for specifying candidate points for introduction of devices that absorb or supply electric power according to the present invention are explained. Then, calculation hardware 400, an arithmetic algorithm 500, and a calculation data format 600 of the embodiment are explained. Lastly, an embodiment of a user interface 700 is explained.

FIG. 1 is a calculation flowchart example for specifying candidate points for introducing devices that absorb or supply electric power according to the present invention.

FIG. 1, the calculation flowchart 100 is configured from a device selection module 110, a device characteristic selection module 120, an index selection module 130, an index ranking calculation module 140, and a combination module 150 for introduction candidate points based on indexes. In the following explanation, processing contents in the modules are explained.

Figure 2:
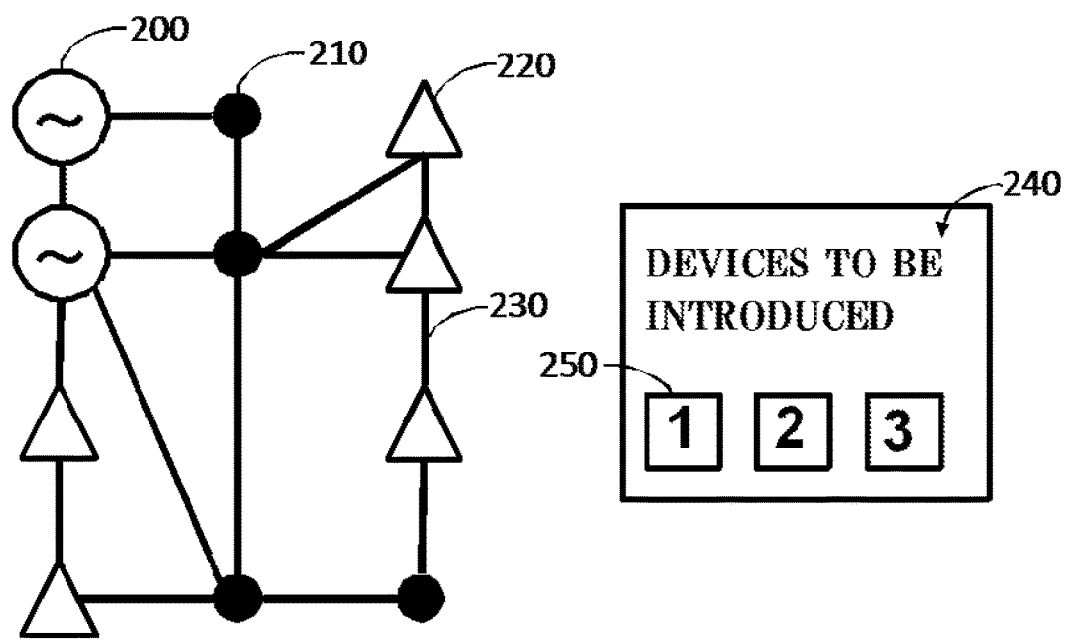
FIG. 2 shows a conceptual diagram of a power system before the devices that absorb or supply electric power are introduced and selection of the devices to be introduced.

FIG. 2 is a conceptual diagram of a power system before devices that absorb or supply electric power are introduced and selection of devices to be introduced.

FIG. 2, the power system is configured from a generator bus 200, a substation bus 210, a load bus 220, a transmission line 230, a list 240 of devices that absorb or supply electric power, and devices 250 included in the list 240 of devices that absorb or supply electric power. In FIG. 2, classifications of the devices 250 that absorb or supply electric power such as a storage and a FACTS device are described by numbers. In FIG. 2, there are only three types of devices 250 in the list 240 of devices that absorb or supply electric power. However, actually, there is no limit in the number of the devices 250. As shown in FIG. 2, in order to take into account all power current flows flowing in the transmission line on the basis of a complex network theory, information concerning bus types of the generator bus, the substation bus, and the load bus is used.

Figure 9:
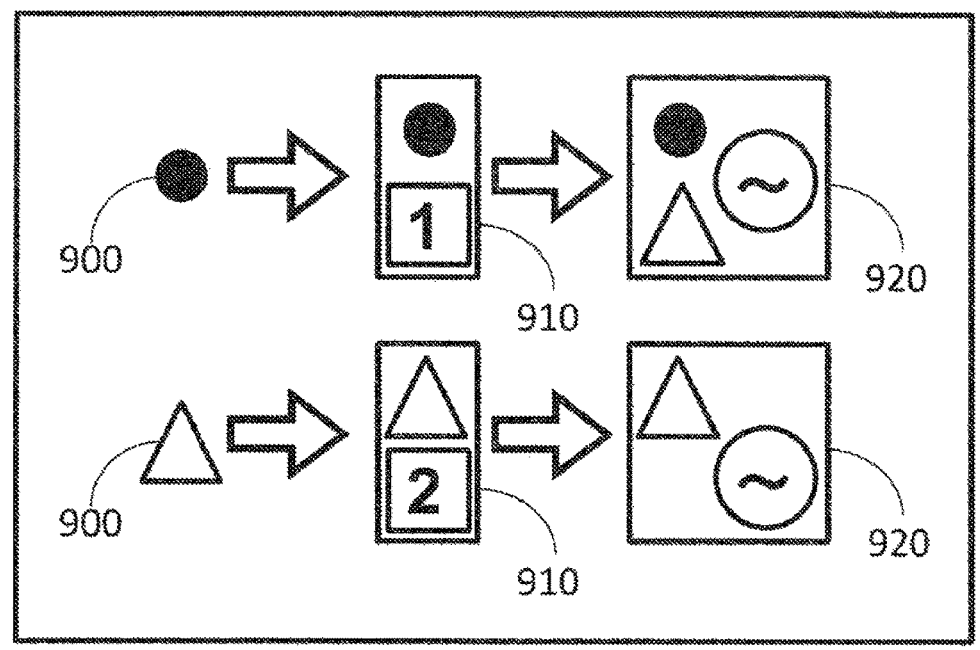
FIG. 9 shows a conceptual diagram of a change from a bus having only one bus type to a bus having a plurality of bus types due to the introduction of the devices in the embodiment of the present invention.

As shown in FIG. 9, a bus 900 having only one bus type changes to a bus 920 having a plurality of bus types according to introduction 910 of devices.

The devices 250 that absorb or supply electric power are selected one by one by the device selection module 110. Candidate points for introducing the devices are specified on the basis of the calculation flowchart 100. Note that a specific arithmetic algorithm for specifying candidate points is explained below.

Figure 3:
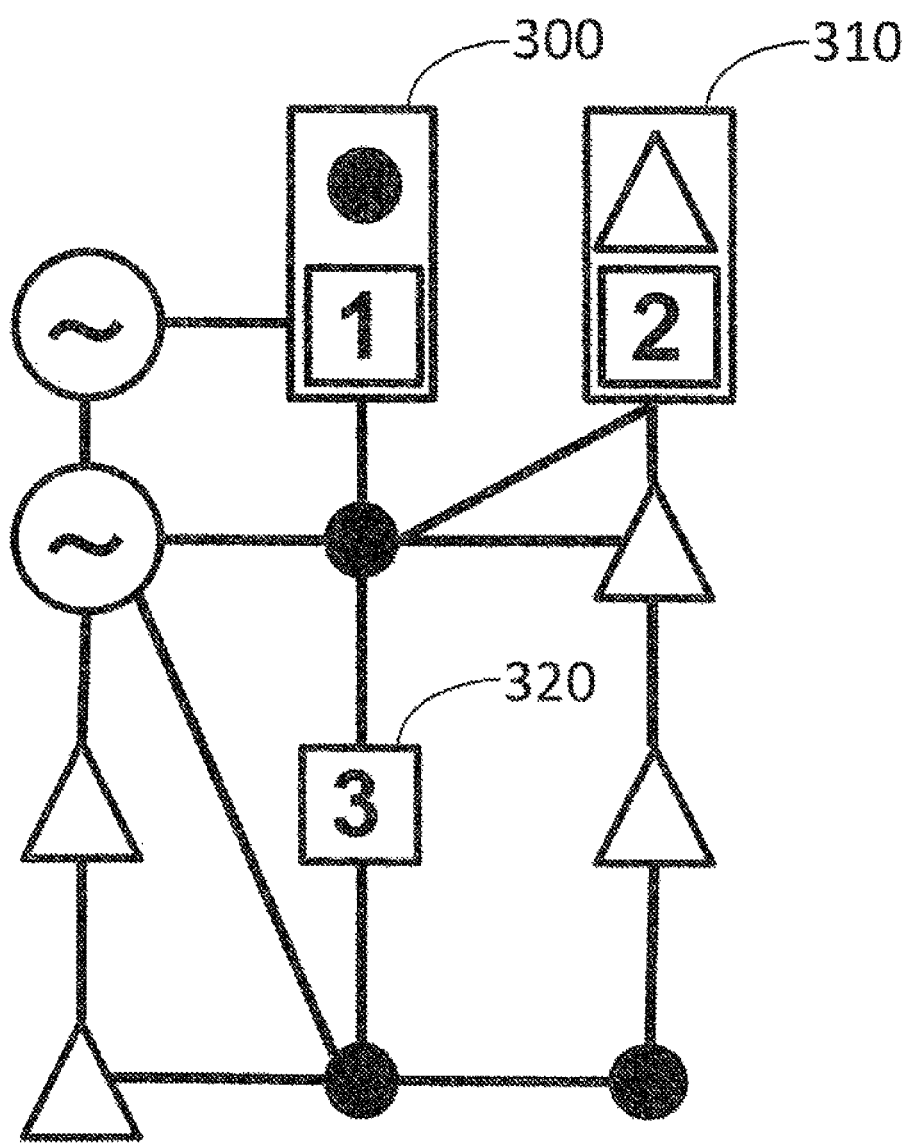
FIG. 3 shows a conceptual diagram of the power system after the devices that absorb or supply electric power are introduced.

FIG. 3 is a conceptual diagram of the power system after the devices that absorb or supply electric power are introduced.

As an example of a result of the calculation flowchart 100, the three devices 250 in the list 240 of devices that absorb or supply electric power are respectively introduced like a substation bus 300, a load bus 310, and an inter-bus device 320.

Figure 4:
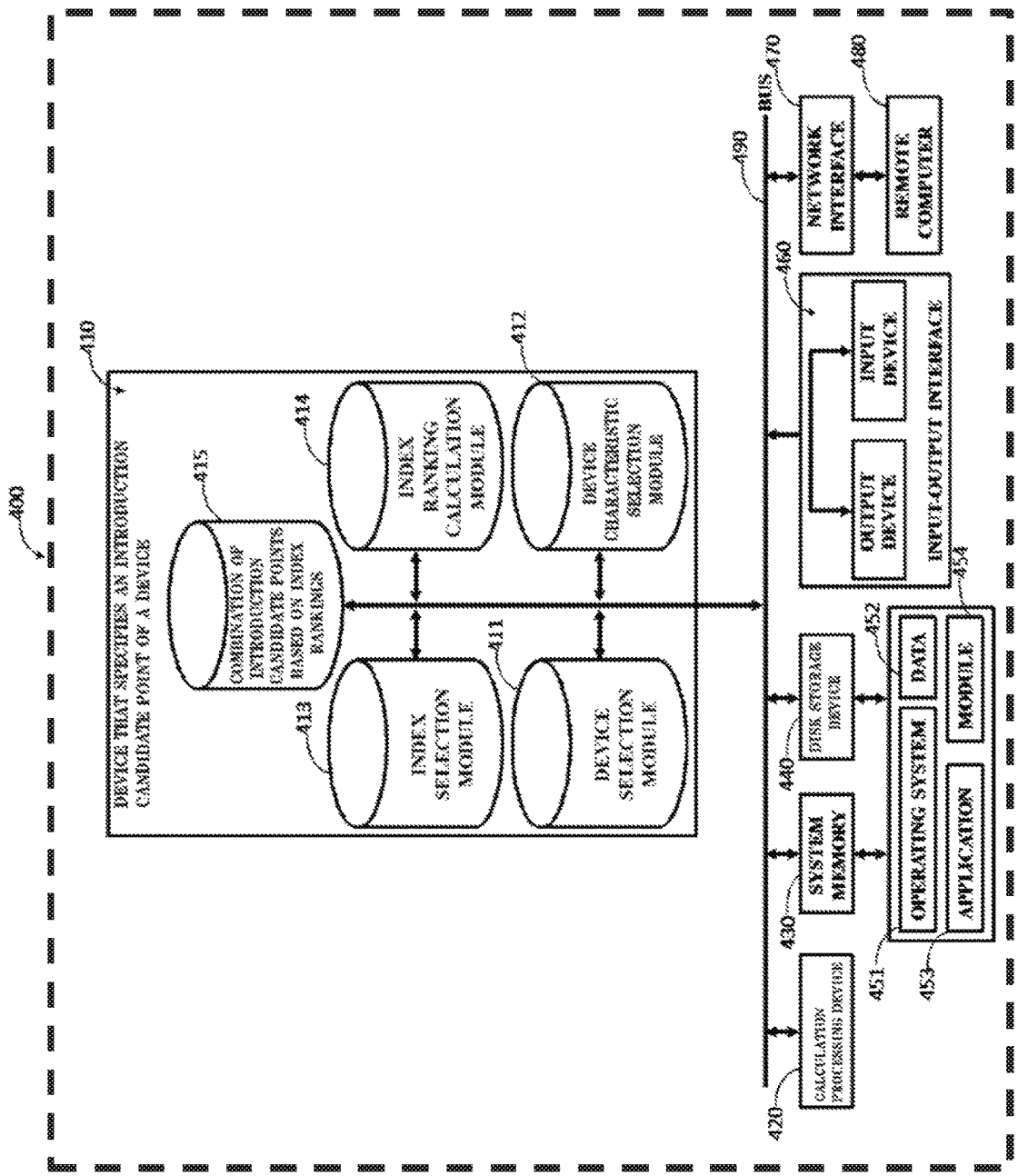
FIG. 4 shows a calculation hardware configuration example in an embodiment of the present invention.

FIG. 4 is a calculation hardware configuration example in the embodiment of the present invention.

The calculation hardware 400 is configured from a device 410 that specifies candidate points for introducing devices, the device 410 being configured from a device selection module 411, a device characteristic selection module 412, an index selection module 413, an index ranking calculation module 414, and a combination module 415 for introduction candidate points based on indexes, an arithmetic processing device 420, a system memory 430, a disk storage device 440, an operating system 451, data 452, an application 453, a module 454, an input/output interface 460, a network interface 470, a remote computer 480, and a communication bus 490. The arithmetic processing device 420 realizes a function for reading and executing, from the device 410 that specifies candidate points for introducing devices, an arithmetic operation for specifying candidate points for introducing devices into the system memory 430. Further, a program for realizing the function of the present invention can be read from another storage medium or downloaded from another device via a network.

Figure 5:
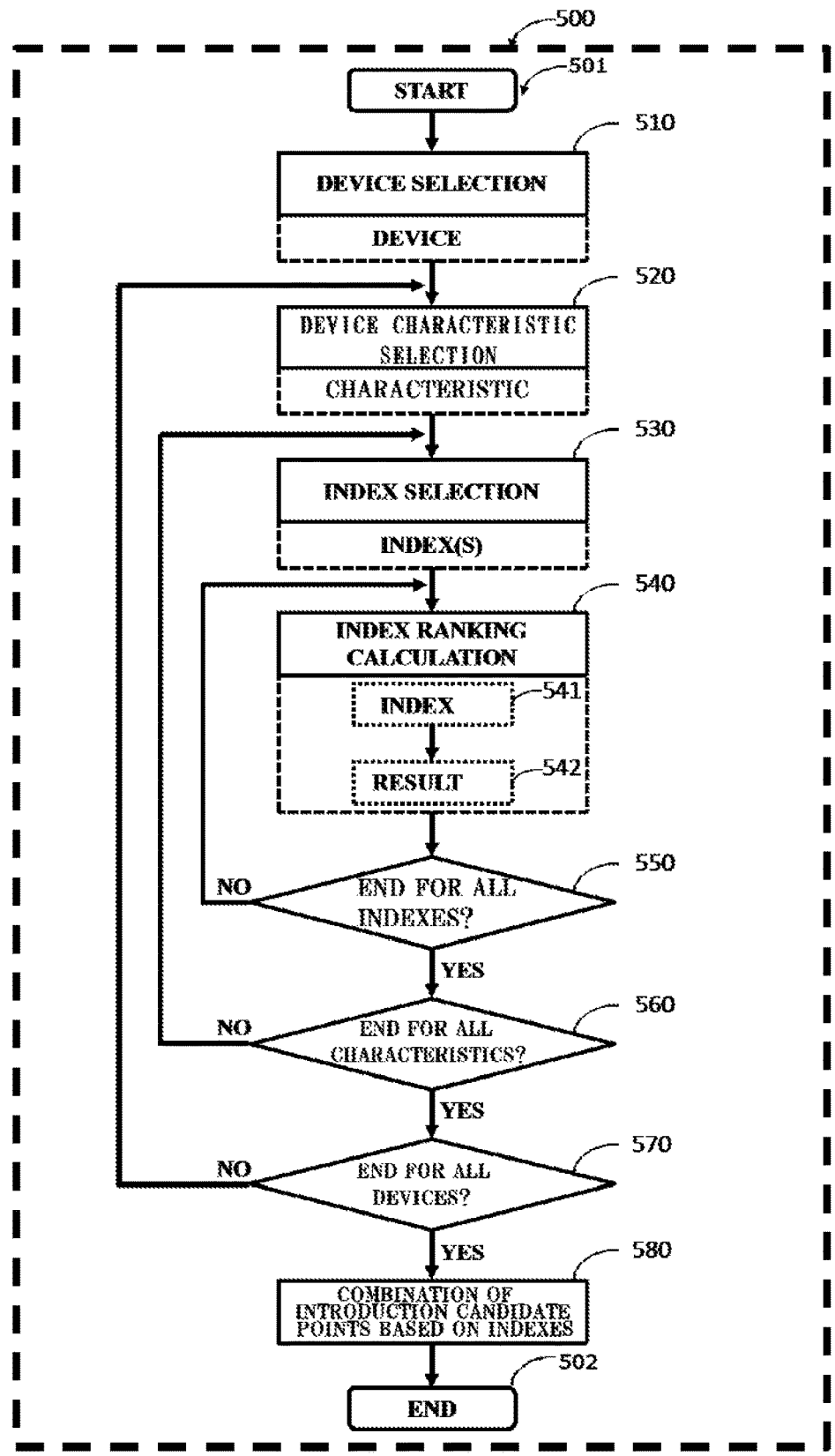
FIG. 5 shows an arithmetic algorithm example for specifying candidate points for introducing devices that absorb or supply electric power in the embodiment of the present invention.

FIG. 5 is an arithmetic algorithm example for specifying candidate points for introducing devices that absorb or supply electric power in the embodiment of the present invention.

FIG. 5 shows a flowchart of the arithmetic algorithm 500. The arithmetic algorithm 500 is configured from a calculation start 501, a calculation end 502, a device selection calculation section 510, a device characteristic selection calculation section 520, an index selection calculation section 530, an index ranking calculation section 540, an all indexes calculation end determination section 550, an all characteristics calculation end determination section 560, all devices calculation end determination section 570, and a combination calculation section 580 for candidate points for introduction based on indexes.

In the following explanation, as an example, a method of specifying candidate points for introducing a FACTS device as a device that absorbs or supplies electric power is explained on the basis of the arithmetic algorithm 500.

First, a device that absorbs or supplies electric power is selected in the device selection calculation section 510. In this example, a FACTS device is selected.

Subsequently, in the device characteristic calculation section 520, characteristics of a transmission line and a bus affected by the FACTS device selected in the device selection calculation section 510 are selected. In this example, impedance of the transmission line is selected.

Subsequently, in the index selection calculation section 530, indexes related to the characteristics of the transmission line and the bus selected in the device characteristic calculation section 520 are selected. In this example, if is assumed that Increased Net-Ability (INA) is selected as an overall index of the power system and Average-Impedance (AI) is selected as a local index.

First, the INA is explained. $INA_i$ in the case in which the FACTS device is coupled to a bus i is calculated by Equation 1.

$$INA_i = \left( \frac{NA_i - NA_0}{NA_0} \right) \quad \text{[Equation 1]}$$

In Equation 1, NA represents Net-Ability of the power system. Subscripts 0 and i respectively means before and after the coupling of the FACTS device to the bus i.

The Net-Ability is explained in NPTL 2 and is calculated by Equation 2.

$$NA = \frac{1}{N_G N_D} \sum_{g \in G} \sum_{d=(d \neq g) \in D} \frac{C_{gd}}{\Delta_{gd}} \quad \text{[Equation 2]}$$

As signs of Equation 2, $N_G$ indicates the number of generator buses, $N_D$ indicates the number of load buses, G indicates a set of all generator buses of the power system, D indicates a set of all load buses of the power system, g indicates a generator bus, d indicates a load bus, $C_{gd}$ indicates a transmission capacity from the generator bus g to the load bus d, and $\Delta_{gd}$ indicates equivalent impedance between the generator bus g and the load bus d.

The Net-Ability is an index that represents, on the basis of a network theory, an average transmittable capacity between a generator group and a load group in the power system.

Figure 8:
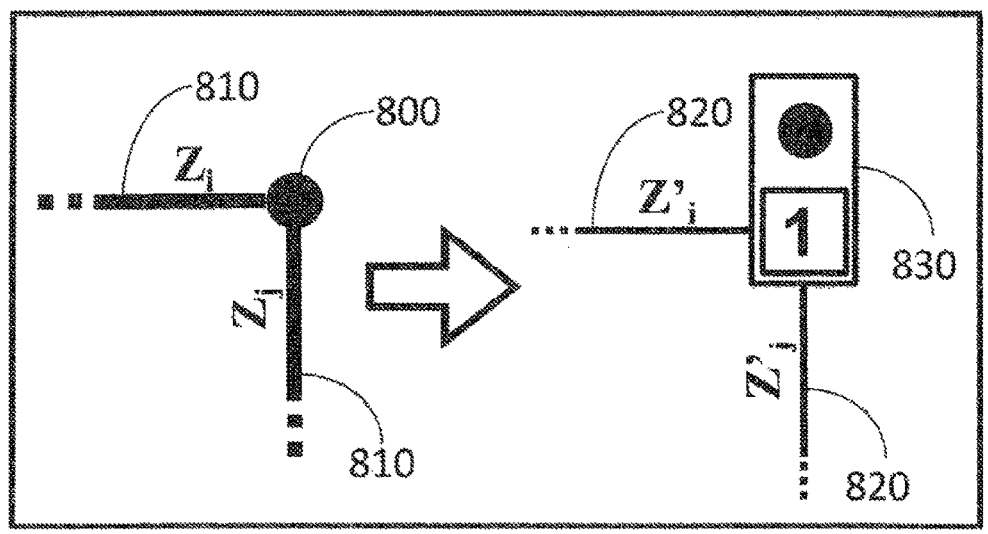
FIG. 8 shows a conceptual diagram of the influence on the impedance of a transmission and distribution line due to device introduction into a bus in the embodiment of the present invention.

FIG. 8 is a conceptual diagram of the influence on the impedance of a transmission and distribution line due to device introduction into a bus in the embodiment of the present invention. By introducing a device 830 into a bus 800, transmission line impedance 810 before the device introduction changes (decreases) as indicated by transmission line impedance 820 after the device introduction.

When the impedance of the transmission line decreases, the Net-Ability takes a larger value. INAs are calculated concerning all buses into which a device can be introduced. A bus having the largest INA is an introduction candidate point of the device.

$C_{gd}$ is explained in NPTL 2 and is calculated by Equation 3.

$$C_{gd} = \min_{l \in L}\left[\frac{P^l_{max}}{f^l_{gd}}\right] \quad \text{[Equation 3]}$$

As signs of Equation 3, L indicates a set of all transmission lines of the power system, l indicates a transmission line, $P^l_{max}$ indicates maximum transmission power of the transmission line l, and $f^l_{gd}$ indicates a current flow division coefficient of the transmission line l in power transmission from the generator bus g to the load bus d.

$\Delta_{gd}$ is explained in NPTL 2 and is calculated by Equation 4.

$$\Delta_{gd} = Z_{gg} - 2Z_{gd} + Z_{dd} \quad (4)$$

As signs of Equation 4, $Z_{gg}$ indicates driving point-impedance of the generator bus g, $Z_{gd}$ indicates transmission impedance between the generator bus g and the load bus d, and $Z_{dd}$ indicates driving point impedance of the load bus d.

AI is explained. $AI_i$ of the bus i is calculated by Equation 5.

$$AI_i = \frac{1}{N_G} \sum_{g \in G} \Delta_{gi} \quad \text{[Equation 5]}$$

As signs of Equation 5, $N_G$ indicates the number of generator buses, G indicates a set of all generator buses of the power system, and g indicates a generator bus.

$\Delta_{gi}$ is calculated by Equation 6.

$$\Delta_{gi} = Z_{gg} - 2Z_{gi} + Z_{ii} \quad (6)$$

As signs of Equation 6, $Z_{gg}$ indicates driving point impedance of the generator bus g, $Z_{gi}$ indicates transmission impedance between the generator bus g and the load bus i, and $Z_{ii}$ indicates driving point impedance of the load bus i.

$AI_i$ is an average of equivalent impedances between the bus i and all generators of the power system. A bus having higher $AI_i$ is a bus that has a larger voltage drop and more easily becomes unstable. A bus having the highest $AI_i$ is an introduction candidate point of a device that absorbs or supplies electric power.

Subsequently, in the index ranking calculation section 540, concerning the indexes selected in the index selection calculation section 530, calculation is performed in an index calculation section 541. Results of the calculation are stored in a result storage section 542 and ranked. It is determined in the all indexes calculation end determination section 550 whether the ranking ends concerning all the indexes. When the ranking ends concerning all the indexes, end determination is performed in the all characteristics calculation end determination section 550. When the ranking does not end concerning all the indexes, the arithmetic algorithm 500 returns to the index ranking calculation section 540. The end determination similar to the end determination explained above is performed concerning the all characteristics calculation end determination section 560 and the all devices calculation end determination section 570. If it is determined in the end determination in the all devices calculation end determination section 570 that the determination ends, in the combination calculation section 580 for candidate points for introduction based on indexes, all the rankings are combined and a candidate point for introducing the device that absorbs or supplies electric power is calculated.

In this example, a method of specifying a candidate point for introduction based on INA and AI is explained.

In the index ranking calculation section 540, concerning all the buses, INAs and AIs are calculated and rankings of the respective indexes are calculated. Subsequently, in the combination calculation section 580 for candidate points for introduction based on indexes, a candidate point for introducing a FACTS device can be calculated by combining the rankings of the INAs and the AIs. By calculating the candidate point and introducing the device in this way, it is possible to perform control with high stability in which the average transmittable capacity between the generator group and the load group in the power system is further increased and the voltage drop of the bus is further reduced.

Figure 6:
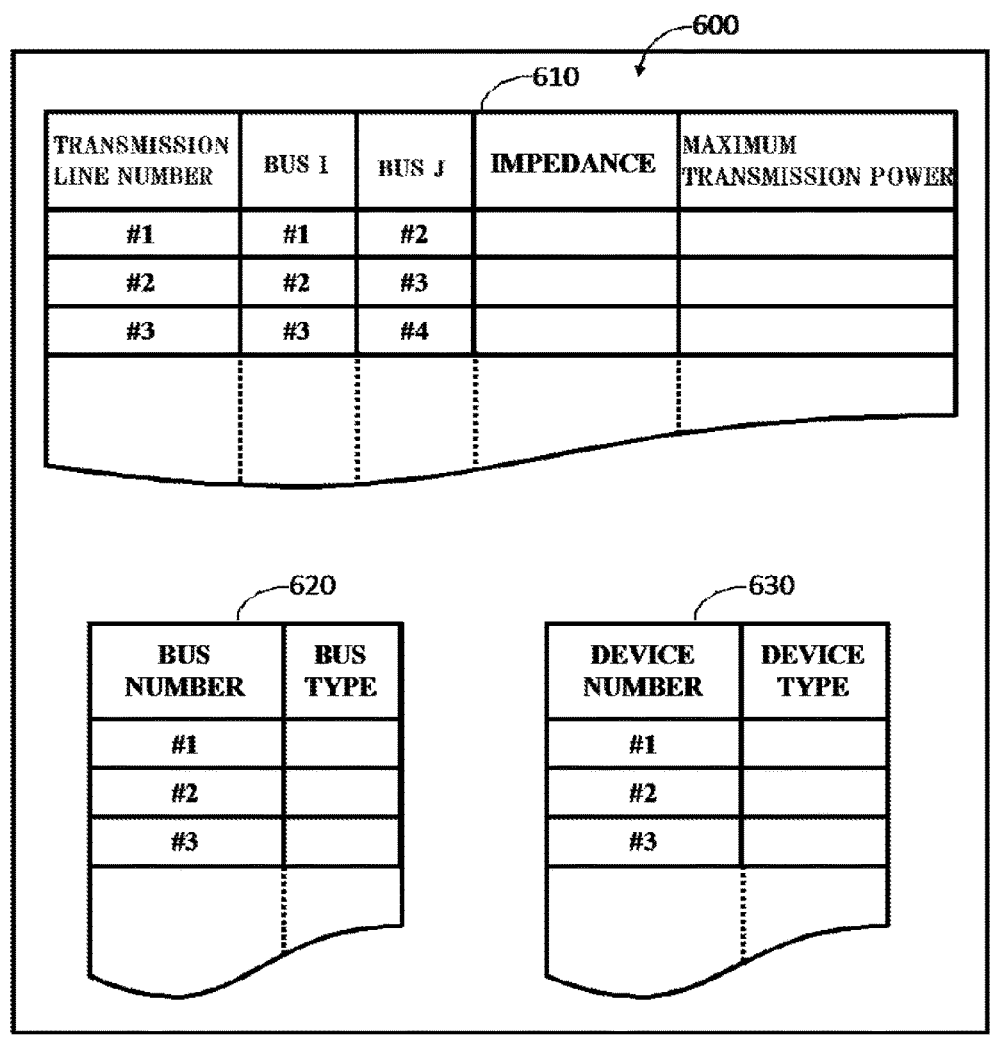
FIG. 6 shows calculation data example for specifying candidate points for introducing the devices that absorb or supply electric power in the embodiment of the present invention.

FIG. 6 is an example of the calculation data format 600 used in the arithmetic algorithm 500.

FIG. 6, the calculation data format 600 is configured from a transmission line data format 610, a bus data format 620, and a data format 630 of devices that absorb or supply electric power.

In the transmission line data format 610, a transmission line number, bus numbers at both ends of the transmission line, transmission line impedance, and maximum transmission power are stored. In the bus data format 620, bus types of a a generator bus, a substation bus, and a load bus are stored. In the data format 630 of devices that absorbs or supplies electric power, types of devices such as a FACTS device, a storage, and solar power generation are stored.

Figure 7:
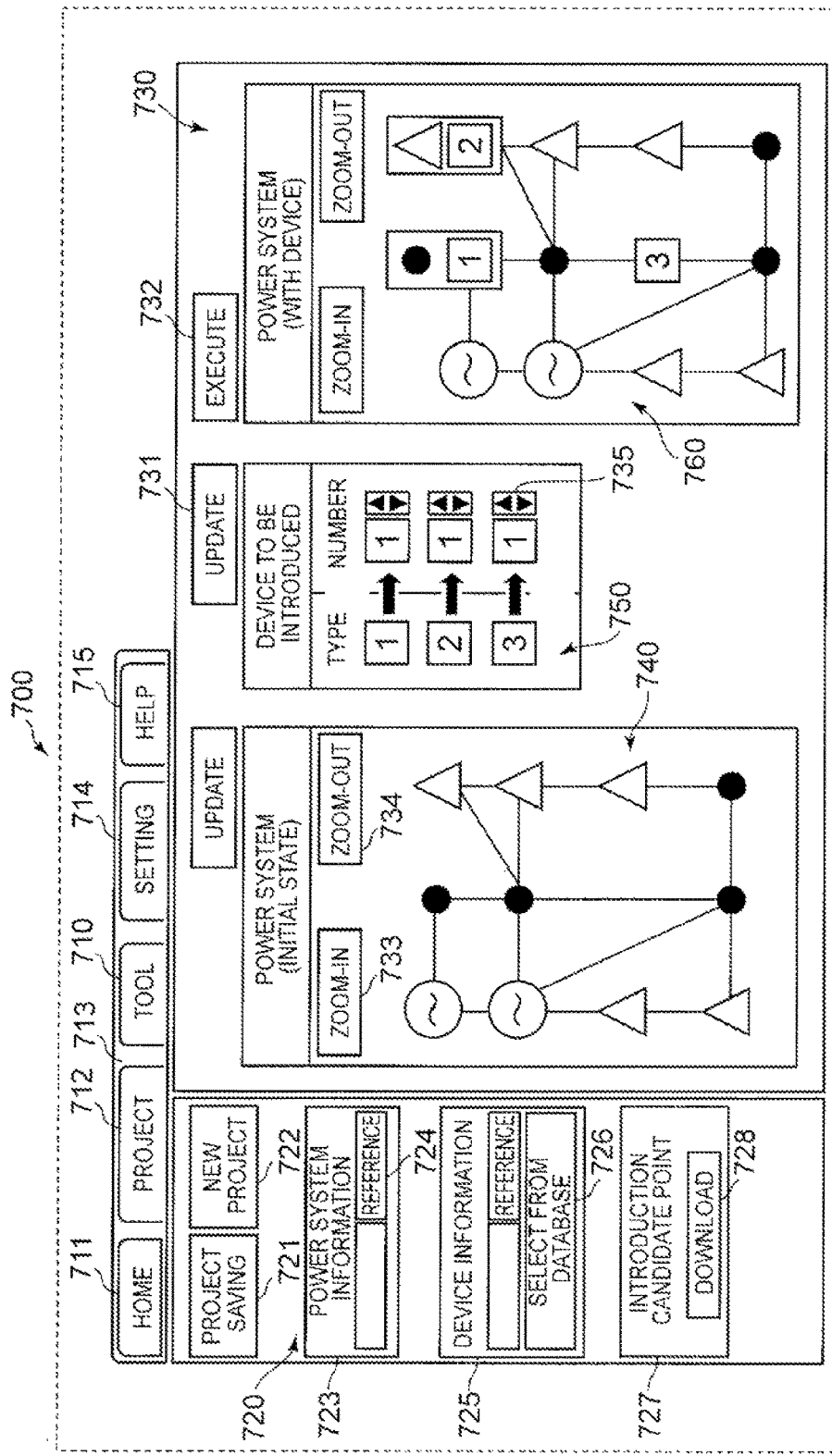
FIG. 7 shows a user interface example in the embodiment of the present invention.

FIG. 7 is an example of a display section (hereinafter, user interface) in the embodiment of the present invention.

The user interface example 700 is configured from a "menu" fab 710, a "home" tab 711, a "project" tab 712, a "tool" tab 713, a "setting" tab 714, a "help" tab 715, a data interface area 720, a "project saving" button 721, a "new project" button 722, a "power: system information" input interface 723, a "reference" button 724, a "device information" input, interface 725, a "select from database" button 726, an "introduction candidate point" input interface 727, a "download" button 728, a power system/device display area 730, an "update" button 731, an "execute" button 732, a "zoom-in" button 733, a "zoom-out" button 734, a numerical value change icon 735, a power system initial state display area 740, a device-to-be-introduced selection area 750, and a power system display area after device introduction 760.

A user inputs information necessary for calculation respectively to the "power system information" input interface 723 and the "device information" input interface 725, operates the device-to-be-introduced selection area 750 to select a device to be introduced, and presses the "execute" button 732 to perform calculation. Consequently, the user can display a result of the calculation in the power system display area after device introduction 760.

REFERENCE SIGNS LIST 100 calculation flowchart
110 device selection module
120 device characteristic selection module
130 index selection module
140 index ranking calculation module
150 combination module for introduction candidate points based on indexes
200 generator bus
210 substation bus
220 load bus
230 transmission line
240 list of devices that absorb or supply electric power
250 device that absorbs or supplies electric power
300 device that absorbs or supplies electric power installed in the substation bus
310 device that absorbs or supplies electric power installed in the load bus
320 device that absorbs or supplies electric power installed between buses
400 calculation hardware
410 device that specifies candidate points for introducing devices
411 device selection module
412 device characteristic selection module
413 index selection module
414 index ranking calculation module
415 combination module for introduction candidate points based on indexes
420 arithmetic processing device
430 system memory
440 disk storage device
451 operating system
452 data
453 application
454 module
460 input/output interface
470 network interface
480 remote computer
490 communication bus
500 arithmetic algorithm
501 calculation start
502 calculation end
510 device selection calculation section
520 device characteristic selection calculation section
530 index selection calculation section
540 index ranking calculation section
541 index calculation section
542 result storage section
550 all indexes calculation end determination section
560 all characteristics calculation end determination section
570 all devices calculation end determination section
580 combination calculation section for candidate points for introduction based on indexes
600 calculation data format example
610 transmission line data format
620 bus data format
630 data format of devices that absorb or supply electric power
700 user interface example
710 "menu" tab
711 "home" tab
712 "project" tab
713 "tool" tab
714 "setting" tab
715 "help" tab
720 data interface area
721 "project saving" button
722 "new project" button
723 "power system information" input interface
724 "reference" button
725 "device information" input interface
726 "select from database" button
727 "introduction candidate point" input interface
728 "download" button
730 power system/device display area 730
731 "update" button
732 "execute" button
733 "zoom-in" button
734 "zoom-out" button
735 numerical value change icon
740 power system initial state display area
750 device-to-be-introduced selection area
760 power system display area after device introduction
800 bus coupled to the transmission line
810 impedance of the transmission line before device introduction
820 impedance of the transmission line after device introduction
830 device introduced into the bus
900 bus having only one bus type
910 introduction of the device
920 bus having a plurality of bus types

The invention claimed is:

1. A power system equipment introduction assistance device that calculates an introduction point of power system equipment coupled to a power system, the introduction assistance device comprising a calculating unit configured to calculate, on the basis of predetermined system information and information concerning the power system equipment scheduled to be introduced, a characteristic of the power system affecting the power system during the introduction of the power system equipment and calculate the introduction point of the power system equipment from a predetermined evaluation index related to the characteristic of the power system;
wherein the predetermined evaluation index includes at least one of an evaluation index concerning an average transmittable capacity between a generator group and a load group or an evaluation index concerning an average of equivalent impedances between a bus and the generator group based on a network theory.

2. The power system equipment introduction assistance device according to claim 1, wherein the calculating unit is configured to repeatedly perform calculation concerning a plurality of pieces of the power system equipment, characteristics of a plurality of the power systems, and a plurality of the evaluation indexes.

3. The power system equipment introduction assistance device according to claim 2, wherein the calculating unit is configured to rank results calculated by the repeated calculation and calculate an introduction point where an evaluation value is highest.

4. The power system equipment introduction assistance device according to claim 1, wherein the characteristic of the power system includes impedance or maximum transmission power of a transmission line and a bus.

5. The power system equipment introduction assistance device according to claim 1, wherein the system information includes information concerning transmission line impedance, information concerning power system topology, and bus classification information including a load bus, a substation bus, and a power station bus.

6. The power system equipment introduction assistance device according to claim 1, wherein the power system equipment includes at least one of a FACTS device, a storage, and solar power generation.

7. The power system equipment introduction assistance device according to claim 1, further comprising a display section configured to display the introduction point, wherein when the system information, information concerning the power system equipment, and a number of introduced devices corresponding to a type of the power system equipment are input, the display section displays a power system diagram after introduction of the power system equipment calculated by the calculating unit.

8. A power system equipment introduction assistance method for calculating an introduction point of power system equipment coupled to a power system, the introduction assistance method comprising calculating, on the basis of predetermined system information and information concerning the power system equipment scheduled to be introduced, a characteristic of the power system affecting the power system during the introduction of the power system equipment and calculating the introduction point of the power system equipment from a predetermined evaluation index related to the characteristic of the power system;

wherein the predetermined evaluation index includes at least one of an evaluation index concerning an average transmittable capacity between a generator group and a load group or an evaluation index concerning an average of equivalent impedances between a bus and the generator group based on a network theory.

* * * * *